G. W. WILKINS.
VEHICLE BODY.
APPLICATION FILED APR. 1, 1920.
1,381,378.
Patented June 14, 1921.
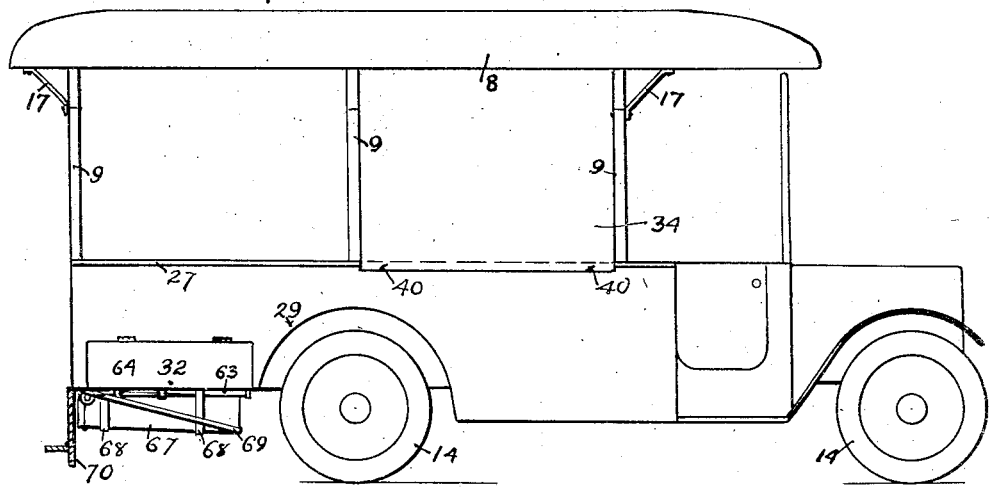
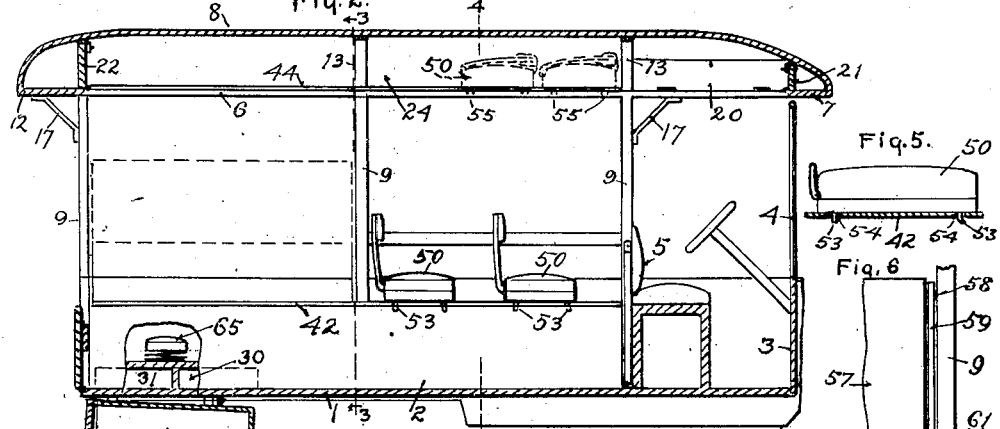
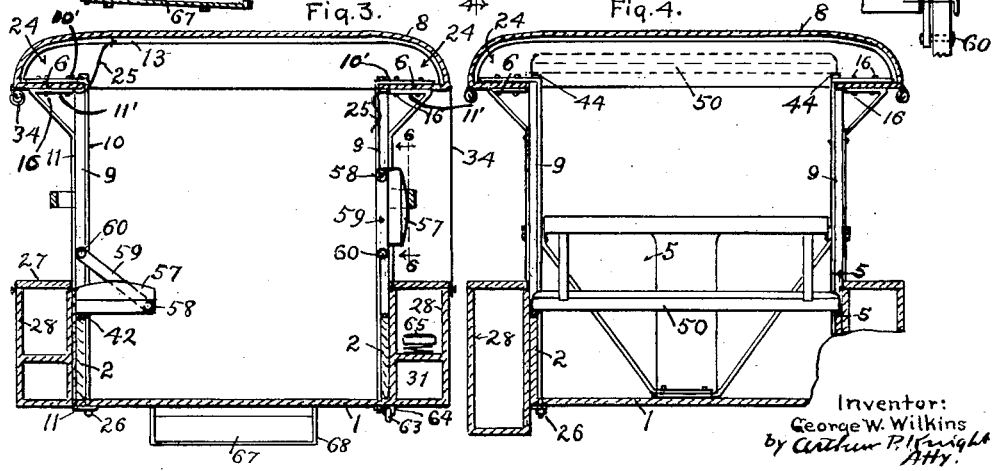
Inventor:
George W. Wilkins
by Arthur P. Knight
Atty.

UNITED STATES PATENT OFFICE.

GEORGE W. WILKINS, OF GLENDALE, CALIFORNIA.

VEHICLE-BODY.

1,381,378.  Specification of Letters Patent.  Patented June 14, 1921.

Application filed April 1, 1920. Serial No. 370,486.

*To all whom it may concern:*

Be it known that I, GEORGE W. WILKINS, a citizen of the United States, residing at Glendale, in the county of Los Angeles and State of California, have invented a new and useful Vehicle-Body, of which the following is a specification.

This invention relates to a vehicle body adapted for use in stages, particularly in cases where baggage or paraphernalia is to be carried, as well as passengers. The vehicle body is intended especially for use in transportation of persons and property in connection with motion picture work but may also be used for other purposes.

The main object of the present invention is to provide a vehicle body of this character with storage compartments conveniently located and adapted to coöperate with and support curtain means for the vehicle body.

A further object of the invention is to provide improved seating means in the vehicle but adapted for removal out of the way when desired.

The accompanying drawings illustrate my invention, and referring thereto:

Figure 1 is a side elevation of the vehicle body.

Fig. 2 is a longitudinal section of the vehicle body with parts broken away;

Fig. 3 is a section on line 3—3 in Fig. 2;

Fig. 4 is a section on line 4—4 in Fig. 2;

Fig. 5 is a section on line 5—5 in Fig. 4;

Fig. 6 is a section on line 6—6 in Fig. 3.

The vehicle body constituting my invention comprises a bed having a floor 1, sides 2, a dash-board 3 at its forward end provided with a windshield 4 and seating accommodations 5 for the driver or chauffeur, extending transversely of the vehicle body, the portion of the vehicle body at the rear of such seating means being adapted for reception of passengers or baggage, as the case may be. Said vehicle body is mounted in the usual manner upon a chassis, the wheels of which are indicated at 14, and is provided with any desired motive means.

A top or cover member 8 extends over the vehicle body, being mounted on uprights or posts 9, which extend from the floor 1 to said top. A lateral extension plate or board 6 extends horizontally outward from the top of posts 9 at each side and horizontal plates 7 and 12 are provided, respectively, at the forward and rear ends of the top. The top 8 extends upwardly from the outer edge of each lateral extension plate 6 and 7 of front and rear extension plates 7 and 12 and over the body of the vehicle, being supported by bows 13, and is of such construction that the top member projects beyond the posts 9 at both sides and at the front and rear, forming pockets at each side and at the front and rear thereof. Some of these pockets may be used for storage purposes, being provided with doors, as indicated at 20, 21 and 22. Other pockets, indicated at 24, may be used as shelves for holding baggage, or other articles, straps, indicated at 25, being provided for holding such articles in place. Each post is preferably provided with reinforcing or bracing means consisting, for example, of upright iron or steel bars 10 and 11, respectively on the inside and outside thereof, bar 11 being bent outwardly to form an oblique brace and then inwardly under the extension plate 6, as shown at 11', and bar 10 being secured to the floor 1 and bar 11 by nut 26 and being extended horizontally at its upper end, as shown at 10', over the top of the post 9, and outwardly over a lateral extension plate or board 6 and said parts 10 and 11' are secured together and to said extension plate by screws or bolts 16. The forward and rear posts 9 may also be provided with longitudinal oblique braces 17 bolted thereto and to lateral and rearward extension plates 6 and 12 of the top. The forwardly extending portion of the top member, indicated at 7, preferably extends somewhat forward of the windshield, indicated at 4, and at a somewhat higher level than the windshield and out of contact or connection therewith, so that no strain is brought on the windshield supports, the overhanging forward extension of the vehicle top being supported wholly from the posts 9.

The bed or body of the vehicle is provided at each side thereof and projecting outwardly from the sides 2, with storage compartments or boxes 28, which may be recessed at their lower portions, as indicated at 29, directly over the rear wheels so as to provide the necessary clearance. Each of said boxes is provided with cover means 27 and may be provided with compartments, indicated at 30 and 31, one of which may be used for receiving a water tank, and the other may be used as a tool box, the compartments being accessible by opening a door 32 in the outer side of the box. These side boxes preferably project about the same distance as the lateral extensions, above described, of the top member, and side curtains 34 are preferably provided secured to said lateral extensions of the top member and adapted to be drawn down and fastened to the outer faces of the said boxes, for example, by buttons 40 thereon, as shown at the right hand side of Fig. 3. The sides 2 of the vehicle body are provided with top rails 42 extending along the upper edges thereof to reinforce same and serving to support the seats hereinafter described. A reinforcing metal strip 44 or side bar is also provided extending horizontally over the extension board 6 adjacent the inner edge thereof, forming the bottom of the lateral extension of the top member and this reinforcing strip 44 is also adapted to serve as a support of certain of the vehicle seats when not in use, as hereinafter described.

Any desired number of forward seats 50 are provided adapted to extend across the vehicle body and to rest at their end portions on the sides 2 of the said body, said seats being provided with lugs or projections 53 adapted to engage in slots 54 in the reinforcing metal side bars 42 aforesaid. When it is desired to use the forward part of the vehicle for passengers, these seats are placed in that portion of the vehicle resting on the side bars aforesaid but at other times said seats may be stored in the top of the vehicle with their end portions resting on the side bars 44 aforesaid, and their lugs 53 engaging in slots 55 in said side bars. Inasmuch as the seats are somewhat longer than the spaces between the side bars 44 at opposite sides of the top, it is necessary to introduce the seats into the space within the top member by passing them upward at an angle so that first one end is introduced and then the other, the top member being sufficiently wide to permit of this operation. The rear part of the vehicle body may be provided with seats 57 pivoted at 58 to straps or links 59 which are pivoted at 60 to the side posts 9 so that the seats may be lowered in the horizontal position shown at the left of Fig. 3, the straps or links 59 then extending obliquely downward so as to support the seats at the portions thereof nearer the longitudinal axis of the body, the outer portions of the seats being supported by resting on the side bars 42 aforesaid, and when it is desired to clear the space within the vehicle for transporting baggage, etc., these seats may be folded up between the posts 9, as indicated at the right of Fig. 3, and may then be retained in this position by locking means, such as a locking pin indicated at 61 in Fig. 6. When the seats 50 and 57 are removed from the bed in the manner above described, the space above the bed and between the floor of the bed and the top of the vehicle, including the space between the side-pockets formed by the lateral extensions of the top, is unobstructed and clear for use for storage or for other purposes.

The vehicle body above described may be provided with other adjuncts according to the use to which it is to be put. For example, it may be provided, if desired, with one or more draw bars 63 slidably mounted in staples 64 thereon to enable the draw bar to be slid in under the body or to be drawn out to position for use. In case the vehicle is used in connection with a motion picture outfit, one of the boxes 28 may be adapted to contain a camera and may be provided with a spring cushion 65 for supporting the tripod. A boot or spare tire receptacle 67 may be hung from the bed floor 1 by straps 68 and 69, and serves also as a rest for the back gate 70 of the vehicle bed when the latter is lowered, as in Fig. 1.

What I claim is:

1. A vehicle body comprising a bed, posts extending upwardly therefrom at each side, boxes at opposite sides of the bed and projecting outwardly from said posts, a top extension plate extending over the posts and projecting outwardly therefrom, a top member extending upwardly from the outer edge of the top plate and over the vehicle, to form pockets in the top member over the top plates, the space between the top plates and over the bed of the vehicle body being unobstructed from the floor of the bed to the top member, and storage compartments provided in said pockets in the top member.

2. A vehicle body, as set forth in claim 1, in which said boxes projecting outwardly from the posts of the vehicle body are provided with horizontal closure means at the top thereof, and with spring cushion means contained within the same.

3. A vehicle body, as set forth in claim 1, and comprising, in addition, lower side bars on the sides of the bed, said side bars having slots, upper side bars on the top member also having slots and seats adapted to extend across the vehicle and to rest on the lower side bars to support the seats in contact for use, and on the upper side bars for storage of the seats in the top member, said seats having lugs adapted to engage said slots in said side bars to hold the seats in position for use or for storage.

4. A vehicle body comprising a bed, side members extending upwardly therefrom at each side, posts at each side of the bed and extending upwardly from the side members, plates resting on said posts and extending outwardly therefrom, a top member extending upwardly from the outer edge portions of said plates and extending over the bed forming pockets over said plates leaving the space between the posts unobstructed from the bed to the top member, and seats mounted on said posts to swing upwardly between the posts to leave said space unobstructed, the mounting of said seats comprising links pivoted to the posts and pivoted to the seats near one edge thereof to support such portion of the seat when lowered for use, the opposite edge of the seats being adapted to rest on the said side members when the seats are lowered, and a locking pin adapted to engage said seat, a supporting link thereof, and a post supporting said link, to hold the seat in raised position.

In testimony whereof I have hereunto subscribed my name this 23rd day of March, 1920.

GEORGE W. WILKINS.